March 4, 1941.    A. I. RISSER    2,233,960
CONTAINER FEEDING DEVICE
Filed Dec. 4, 1939    2 Sheets-Sheet 2
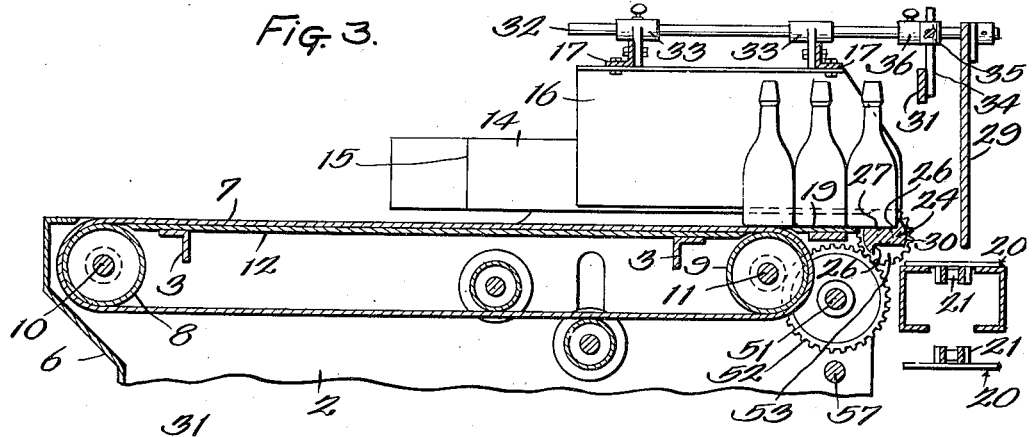
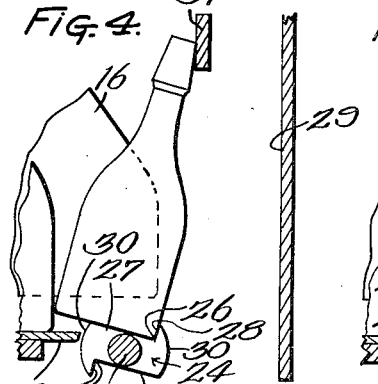
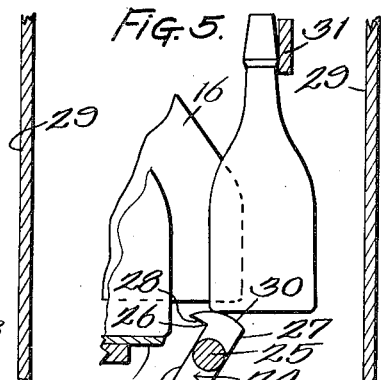
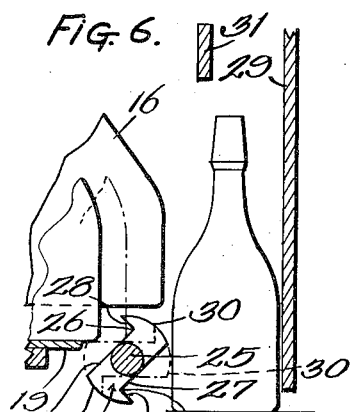
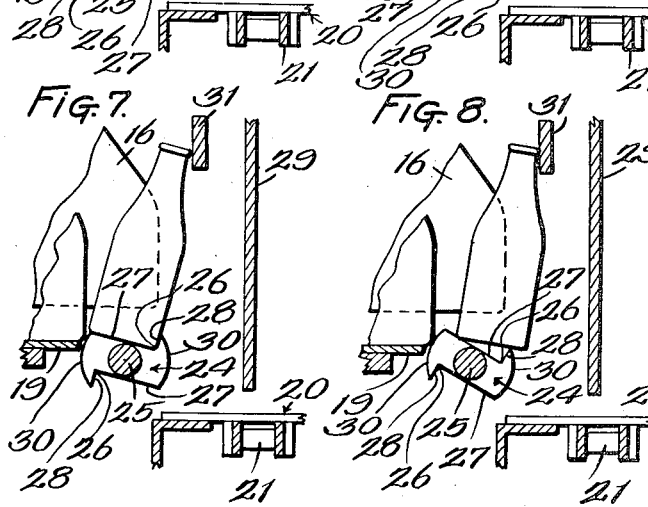
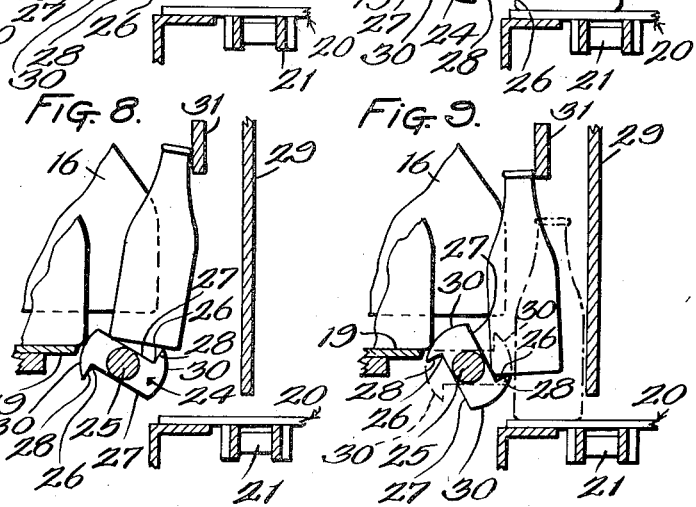
INVENTOR:
ARTHUR I. RISSER
BY John H. Nelson
ATTY.

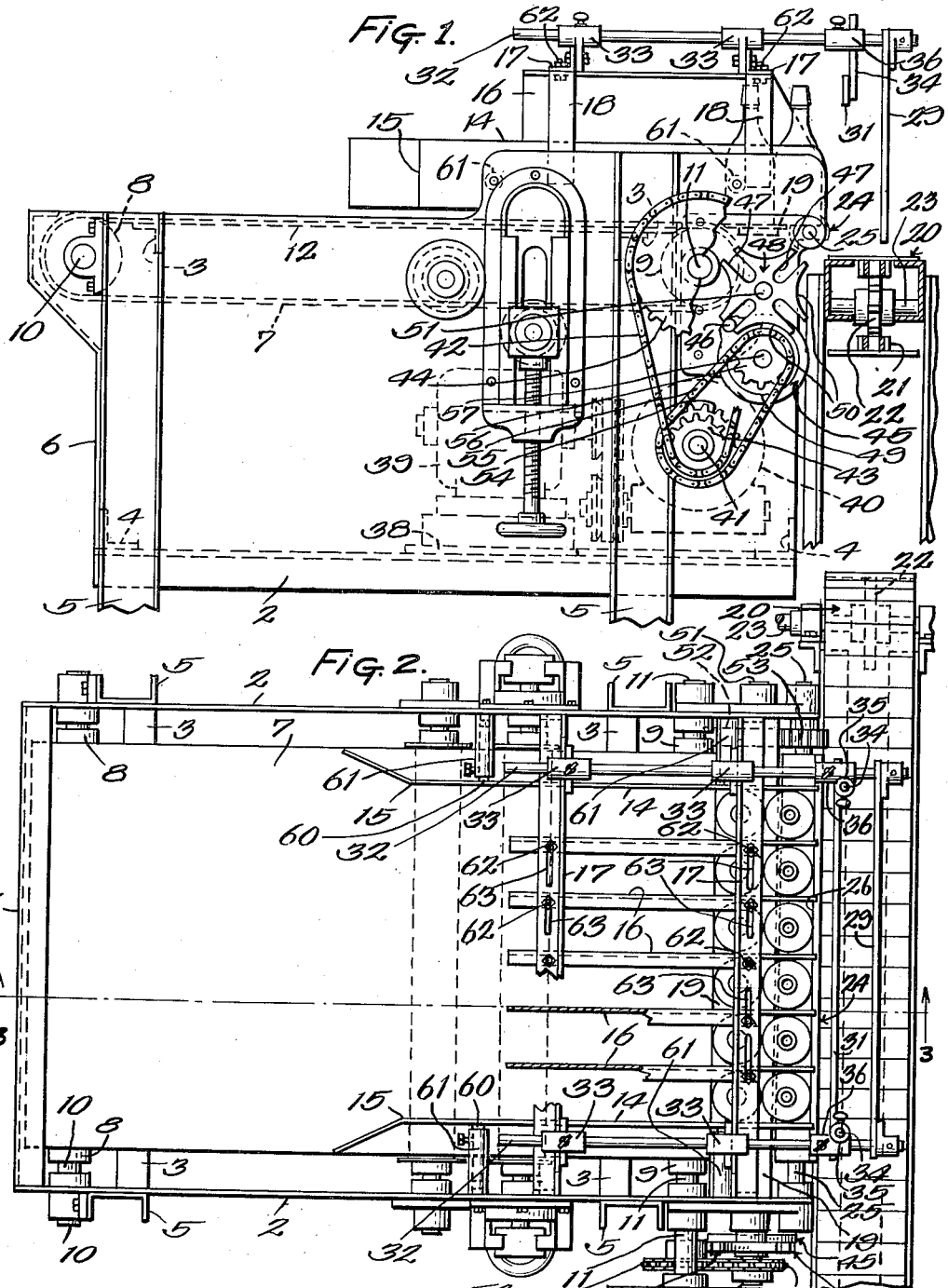

Patented Mar. 4, 1941

2,233,960

UNITED STATES PATENT OFFICE 2,233,960

CONTAINER FEEDING DEVICE

Arthur I. Risser, Chicago, Ill., assignor to U. S. Bottlers Machinery Co., Chicago, Ill., a corporation of Illinois Application December 4, 1939, Serial No. 307,490

5 Claims. (Cl. 198—25)

This invention relates to a container feeding device for feeding containers to a conveyor arranged to advance the containers in side by side single order.

One of the objects of the invention is to provide such a device capable of feeding the containers in upright position to the conveyor in rows.

Another object of the invention is to provide such a device particularly for use in connection with the conveyor of a container cleaning machine, wherein the device may be capable of receiving the containers from cartons in a group and arrange them in proper order for feeding.

Another object is to provide such a device as outlined capable of handling various sizes or shapes of containers with the least amount of adjustment of its parts, and without necessitating the changing of any of the parts.

Other objects and advantages will become apparent by reference to the specification and the accompanying drawings, in which:

Fig. 1 is a side elevation of the feeding device with parts broken away and with other parts in section.

Fig. 2 is a plan view of the device with parts broken away.

Fig. 3 is a longitudinal section of the upper portion of the device as taken on the section line 3—3 of Fig. 2.

Figs. 4, 5 and 6 are each an enlarged detail of certain parts of Fig. 3, with said views illustrating, respectively, various positions of a transporting member of the device and the manner in which large containers are handled thereby.

Figs. 7, 8 and 9 are views somewhat similar to Figs. 4 to 6, respectively, but illustrating the manner in which the smaller containers are handled by the transporting member.

The feeding device, as illustrated in Figs. 1 and 2, includes a frame made up of side frame members 2 in the form of substantially rectangular plates connected by upper and lower cross pieces 3 and 4, respectively. The frame also includes uprights or legs 5 upon which the side frame members are supported, and a front end frame member 6 in the form of a plate connected between the front edges of the side frame members 2.

Disposed between the side frame members 2 is a horizontally arranged endless container feeding conveyor 7 in the form of a belt supported upon an idler roll 8 at the front end of the frame and having its discharging end supported upon a driving roll 9 near the rear end of the frame. The rolls 8 and 9 are mounted respectively on shafts 10 and 11 suitably mounted for rotation in bearings in the side frame members 2.

The upper stretch of the conveyor 7 travels from left to right over a supporting table 12 of the frame, as seen in Figs. 1 to 3, and is wide enough to convey upright containers thereon in longitudinal and transverse rows.

After a group of containers, such as bottles, to be fed are placed upon the trailing or receiving end portion of the conveyor, which may be done by dumping a carton of the bottles in upright position on the conveyor, the bottles are conveyed into cooperative relation with means designed to arrange the bottles in longitudinal and transverse rows at the discharging end portion of the conveyor. To this end, arranged longitudinally over the opposite edge portions of the conveyor at the discharging end portion thereof and mounted on the side frame members 2, respectively, are guide members 14 in the form of plates having end portions 15 between which a group of bottles on the conveyor is initially received and confined on the conveyor. Upon being received between the receiving end portions 15 of the guides 14, the bottles are separated into longitudinal rows by means of laterally spaced guide plates 16 arranged between the plates 14 so as to form with each other and with the plates 14 longitudinal guideways through which the bottles are directed to the discharging end of the conveyor.

The plates 16 are mounted upon a pair of U-shaped brackets 17 whose mid portions extend thereover with leg portions 18 secured to the side frame members 2, respectively.

As the bottles are conveyed off the discharging end of the conveyor 7 over the driving roll 9, they are advanced by succeeding bottles over a stationary feed shelf 19 extending between the side frame members 2 and suitably mounted thereon with its supporting surface in the plane of the supporting surface of the conveyor.

Arranged across the rear or discharging end of the frame at right angle to the conveyor 7 is a horizontally traveling endless conveyor 20 having its upper supporting stretch below the plane of the shelf 19, with transporting means cooperating between the said parts to transport the bottles from the shelf in transverse rows onto the conveyor 20 so as to place the bottles thereon in an upright position, and so that the bottles will be conveyed thereby in single file order. Although the conveyor 20 may constitute the feeding means for any machine adapted to operate upon the bottles while in upright position, in the present invention it may be considered as constituting the means for feeding new bottles to a cleaning machine, in connection with which the feeding device of the invention is especially intended for use. The conveyor 20 comprises an endless sprocket chain 21 having cleated links forming a belt, with the chain being supported at the trailing end of its upper stretch upon a driving sprocket 22 mounted upon a shaft 23 which may be independently driven or may be driven by the driving means of the device later described.

The transporting means includes an intermittently rotated roll-like transporting member 24 arranged alongside the discharging edge of the shelf 19 and being provided with reduced end portions 25 forming trunnions therefor rotatably mounted in suitable bearings in the side frame members 2. The roll-like member is intermittently rotated in a clockwise direction, as seen in Figs. 3 to 9, so as to complete one half turn during each movement thereof, with longitudinally extending recesses 26 being formed in opposite sides of the member, respectively, arranged to alternately receive a row of bottles from the shelf 19, position the bottles in a row on the member and discharge the row of bottles over the side of the member onto the conveyor 20 during movements of the member. Each recess 26 is in the form of an L-shaped groove in the periphery of the roll-like member, with the groove having a wall portion 27 forming a shelf upon which the bottoms of the bottles are supported and having a narrower wall portion 28 forming a stop against which the bottles are aligned in a row on the shelf 27 and serving to prevent the advance of succeeding bottles on the shelf 19 and conveyor 7 between movements of the roll-like member.

As the bottles are discharged over the side of the roll-like member they are brought into cooperative relation with guiding means arranged to direct the bottles onto the conveyor 20 in an upright position as they drop thereon. Said means comprises an upright guide plate 29 spaced laterally of the discharging side of the roll-like member to form with either arcuate side portion 30 of the member between the recesses thereof a guideway through which the bottles are directed in upright position onto the conveyor 20, and serving to maintain the bottles in alignment on the conveyor while being conveyed thereby out of the path of the succeeding row of bottles being fed thereto. Said guiding means also includes a guide bar 31 disposed in the path of the top or neck ends of the bottles being transported by the roll-like member so as to be engaged by said ends during initial movement of the member whereby the bottles will rock thereon and on the member out of the recess thereof into cooperative relation with the side portion 30 adjacent the shelf of the recess to be directed thereby in an upright position onto the conveyor 20.

The guide plate 29 is mounted on the outer ends of a pair of horizontal rods 32 which extend from the top part of the plate longitudinally of the frame over the brackets 17 which are provided with bearings 33 within which the rods are mounted for adjustment to enable adjustment of the plate toward or away from the roll-like member to accommodate various sizes of bottles therebetween. The guide bar 31 is mounted upon the bottom ends of a pair of upright rods 34 which are mounted for vertical adjustment in bearings 35 of sleeves 36 which are supported on the rods 32 for adjustment therealong. Thus the guide bar may be raised or lowered to accommodate the height of the bottles, and may be moved toward or away from the plate 29 to accommodate the width or diameter of the bottles.

While the feeding device is designed to feed various sizes or shapes of bottles, the matter in which the larger bottles are fed by the roll-like member is different than the manner in which the smallest bottles are fed thereby.

In general, the roll-like member is capable of feeding bottles larger in diameter or width than the width of the shelf portions of the member, provided the center of gravity of the bottles is over a shelf portion when received thereon, as seen in Fig. 4. The smallest size bottles the roll-like member is capable of feeding are those whose diameter or width is substantially equal to the width of the shelf portions of the member, so that when the bottles are positioned on a shelf portion, a succeeding row of bottles on the feed shelf 19 will not project into the path of the trailing edge of said shelf portion upon initial movement of the member, as seen in Fig. 7.

Upon initial movement of the roll-like member, when feeding the large bottles, as seen in Fig. 4, the top ends of the bottles thereon will tilt forward into contact with the bar 31. As the said member continues to rotate, as seen in Fig. 5, the bottles will rock forward upon said bar and cause the bottoms thereof to tilt off the shelf 27 of the member and then rock upon the trailing edge thereof into contact with the adjacent arcuate side portion 30 of the member. Then as the roll-like member completes its final movement, as seen in Fig. 6, the bottles will continue to rock and slide upon said side wall portion 30 into position between same and the guide plate 29 to drop onto the conveyor 20 in an upright position.

After initial movement of the roll-like member, when transporting the smallest bottles, and the bottles have been tilted by the member into contact with the guide bar 31, as seen in Fig. 7, the bottles will rock upon the bar out of engagement with the stop wall 28 of the recess of the member and then slide and rock upon the top edge of said wall and the shelf 27 of the recess as the shelf tilts, as seen in Fig. 8. When the shelf approaches a vertical position upon continued movement of the member, as seen in Fig. 9, the bottles will momentarily rest upon the stop wall in an upright position until they are deflected therefrom by the trailing edge of the shelf to drop onto the conveyor 20 in an upright position between the guide plate 29 and the side portion 30 of the member adjacent the shelf, as said side portion is brought into position opposite the plate upon final movement of the member.

During movements of the roll-like member 24, the arcuate side portions 30 thereof serve as stops moving alternately into the path of the succeeding bottles on the feed shelf 19, to prevent advance of the bottles over the shelf until a recess of the member has been brought into cooperative relation therewith to receive a row of bottles therefrom.

The conveyor 7 and roll-like member are so driven in timed relation that the rows of bottles fed thereby onto the conveyor 20 will form a single row thereon. To this end, mounted on a supporting platform 38 connected between the side frame members 2 is a motor 39 driving a speed reducer 40 mounted on the inner side of one of the side frame members and having a drive shaft 41 extending therethrough in driving connection with the shaft 11 of the driving roll 9 through the intermediation of a sprocket chain 42 trained over sprocket gears 43 and 44 secured on the shafts respectively. The speed reducer shaft 41 is also in driving connection with the roll-like member 24 to intermittently rotate same through the intermediatiaon of a Geneva motion connection.

The Geneva motion is of a common type including a constantly rotating disc 45 having an eccentrically located driving pin 46, which, during one quarter of each revolution of the disc, operates within one of the four radial slots 47 of a four-pointed star wheel 48 to rotate same a quarter of a revolution. A concentric cam formation 49 is provided on the disc which, during the remaining three quarters of each revolution thereof, is engaged within one of the arcuate cut-outs 50 of the star wheel to hold same from rotating. The star wheel is connected with the roll-like member to intermittently rotate same by being mounted on a shaft 51 mounted in bearings in the side frame members 2 and having thereon a spur gear 52 in mesh with a spur gear 53 one half its pitch diameter which is secured on one of the trunnions of the member. The disc 45 is driven by the reducer shaft by means of a sprocket gear 54 on said shaft driving a sprocket chain 55 which in turn drives a sprocket gear 56 mounted on a shaft 57 mounting the disc and being rotatably mounted in suitable bearings in the side frame members 2.

The sprocket gears 43, 44, 54 and 56 are so proportioned to drive the conveyor 7 and roll-like member 24 in such timed relation that when a shelf 27 of the member is initially brought into position to receive a row of the large bottles from the feed shelf 19, as seen in dot and dash lines in Fig. 6, the leading bottles on the said shelf will still be supported thereon with their center of gravity thereabove before being advanced thereover by the succeeding bottles onto the shelf of the member.

The guide plates 14 and 16 are mounted on the side frame members 2 and brackets 17, respectively, for adjustment laterally with respect to each other to accommodate the various sizes or shapes of bottles therebetween. To this end, each guide plate 14 has secured thereon a pair of laterally projecting pins 60 which are adjustably mounted within supporting sleeves 61 projecting from and mounted on the inner sides of the side frame members. For adjusting the plates 16, each plate on both sides of the central plate, as seen in Fig. 2, is secured to each bracket 17 by a bolt 62 which is received within a slot 63 provided in the bracket to permit lateral adjustment of the plate.

The motor 39 may be of the variable speed type, or it may drive the speed reducer 40 through the intermediation of any suitable type of variable transmission to cause the feeding device to operate in proper timed relation with the conveyor 20, whereby the rows of bottles fed thereto will form a single row thereon, in the event the said conveyor is to be independently driven.

The type of carton mentioned in the foregoing, within which the new bottles may be received for treatment, is that within which the bottles are contained in longitudinal and transverse rows with their bottoms facing the cover of the carton. Thus when the cover of the carton is opened or removed and the bottles dumped onto the conveyor 7, they will assume an upright position thereon.

By virtue of the structure described, a simple, compact, dependable and inexpensive feeding device has been provided that will handle various sizes or shapes of bottles, and that will be capable of expeditiously receiving groups of bottles from cartons and then feeding same to a conveyor adapted to convey the bottles in an upright position in side by side single order.

Having thus described my invention, I claim:

1. In combination, a traveling conveyor to feed upright containers in longitudinal and transverse rows, a conveyor traveling at right angles to the feeding conveyor adapted to convey upright containers in a single row, and means interposed between the conveyors to receive the transverse rows of containers from the feeding conveyor and transport same onto the second conveyor, wherein said means includes a horizontally disposed intermittently rotated roll-like transporting member arranged and having means thereon for receiving a transverse row of containers from the feeding conveyor between movements thereof and then discharge the containers over the side of the member onto the second conveyor during movement of the member, and means cooperating with said side of the member to form therewith a guideway for guiding the containers onto the conveyor in an upright position.

2. In a container feeding device, a horizontally disposed intermittently rotated roll-like transporting member having a longitudinally extending recess adapted to receive and position a row of upright containers between movements of the member and then discharge the row over a side of the member during movements thereof, and means for causing the containers to assume an upright position as they are discharged over said side.

3. The structure as defined in claim 2, wherein the last means includes an upright guide plate spaced laterally of the side of the member to form therewith a guideway for the containers.

4. The structure as defined in claim 2, wherein the last means includes a guide bar arranged to be engaged by the upper end portions of the row of containers upon initial movement of the member whereby the containers will rock on said bar and on the member out of the recess upon final movement of the member.

5. The structure as defined in claim 2, wherein the last means includes an upright guide plate spaced laterally of the side of the member to form therewith a guideway for the containers, and a guide bar arranged to be engaged by the upper end portions of the row of containers upon initial movement of the member whereby the containers will rock on said bar and on the member out of the recess and then directed into the guideway upon final movement of the member.

ARTHUR I. RISSER.